No. 859,254. PATENTED JULY 9, 1907.
J. RIPCZINSKE.
COW MILKER.
APPLICATION FILED FEB. 13, 1907.
3 SHEETS—SHEET 2.
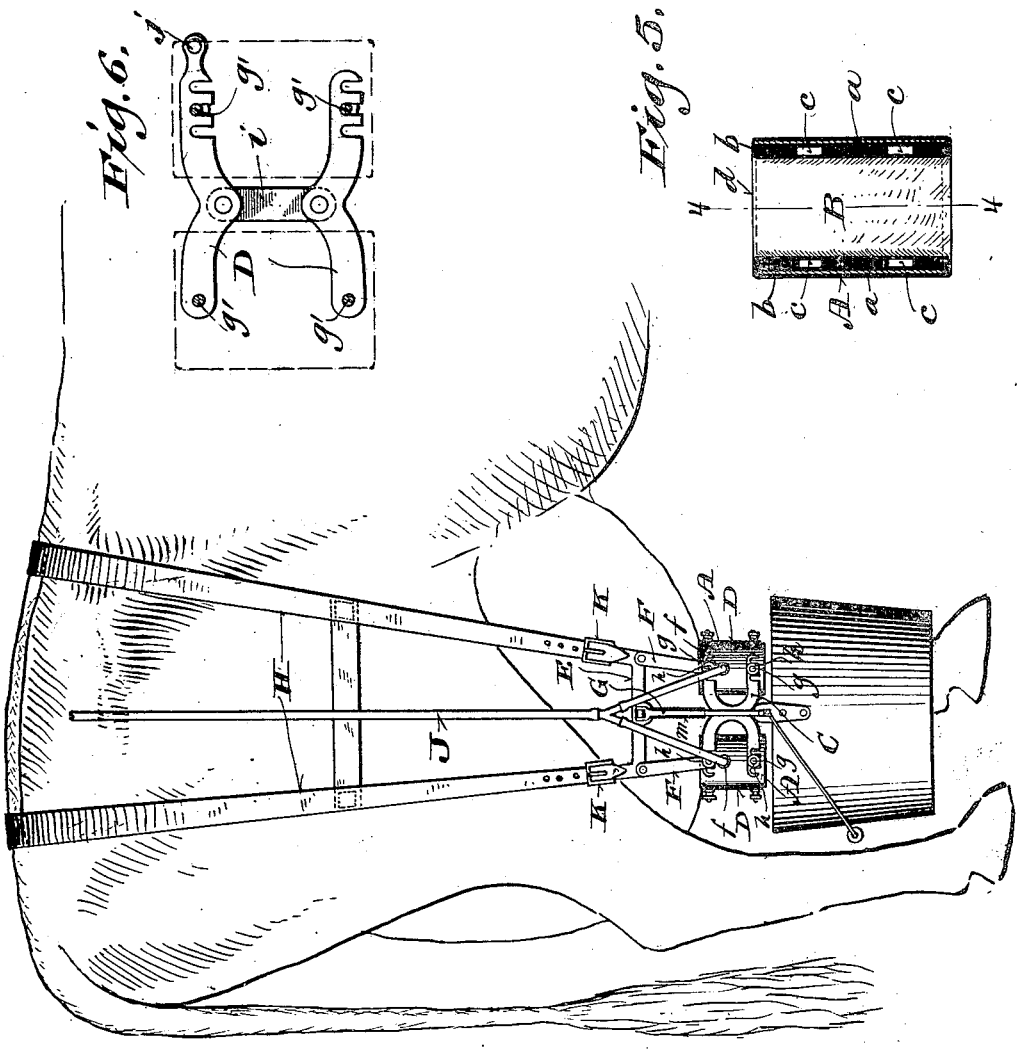

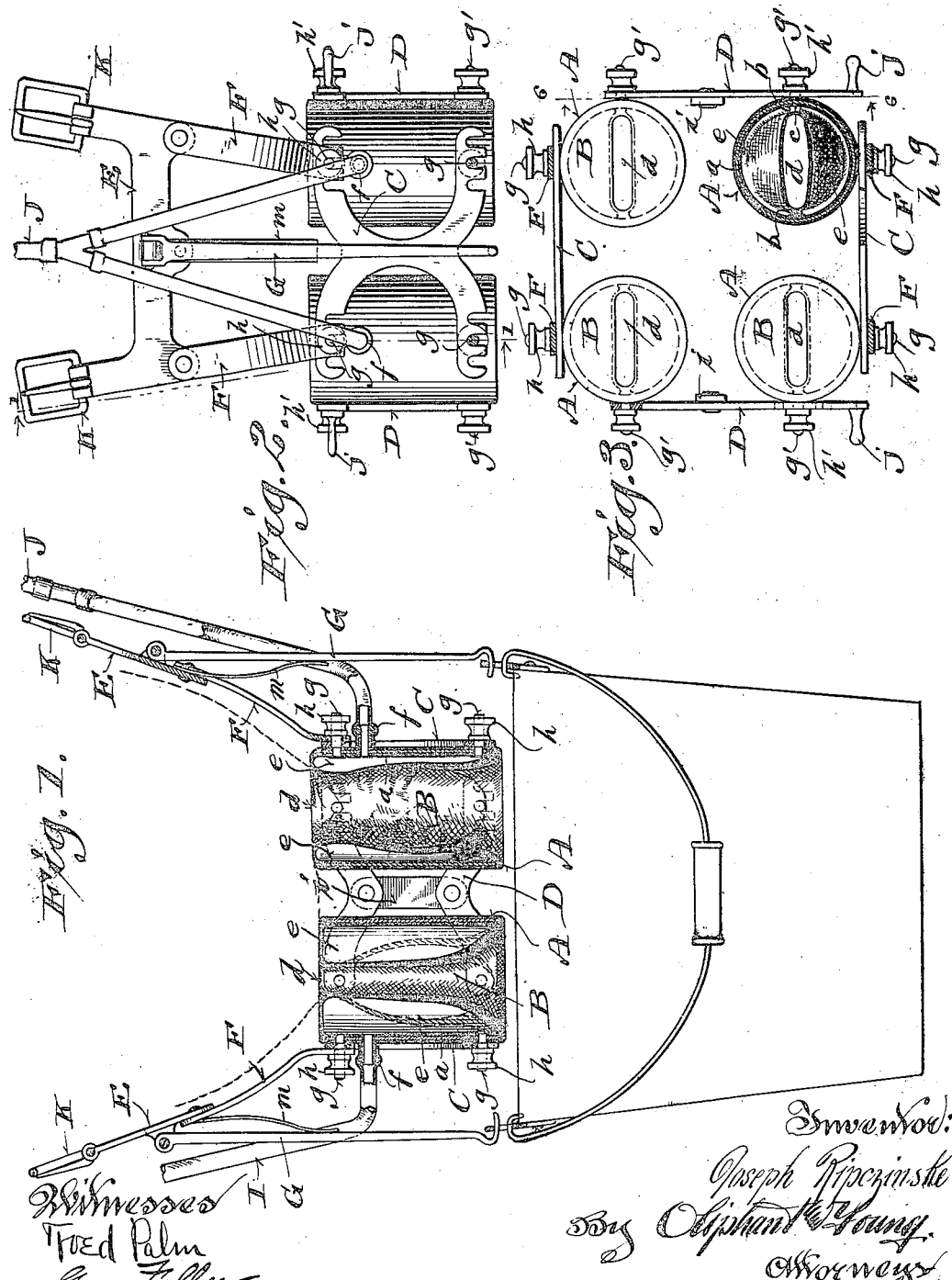

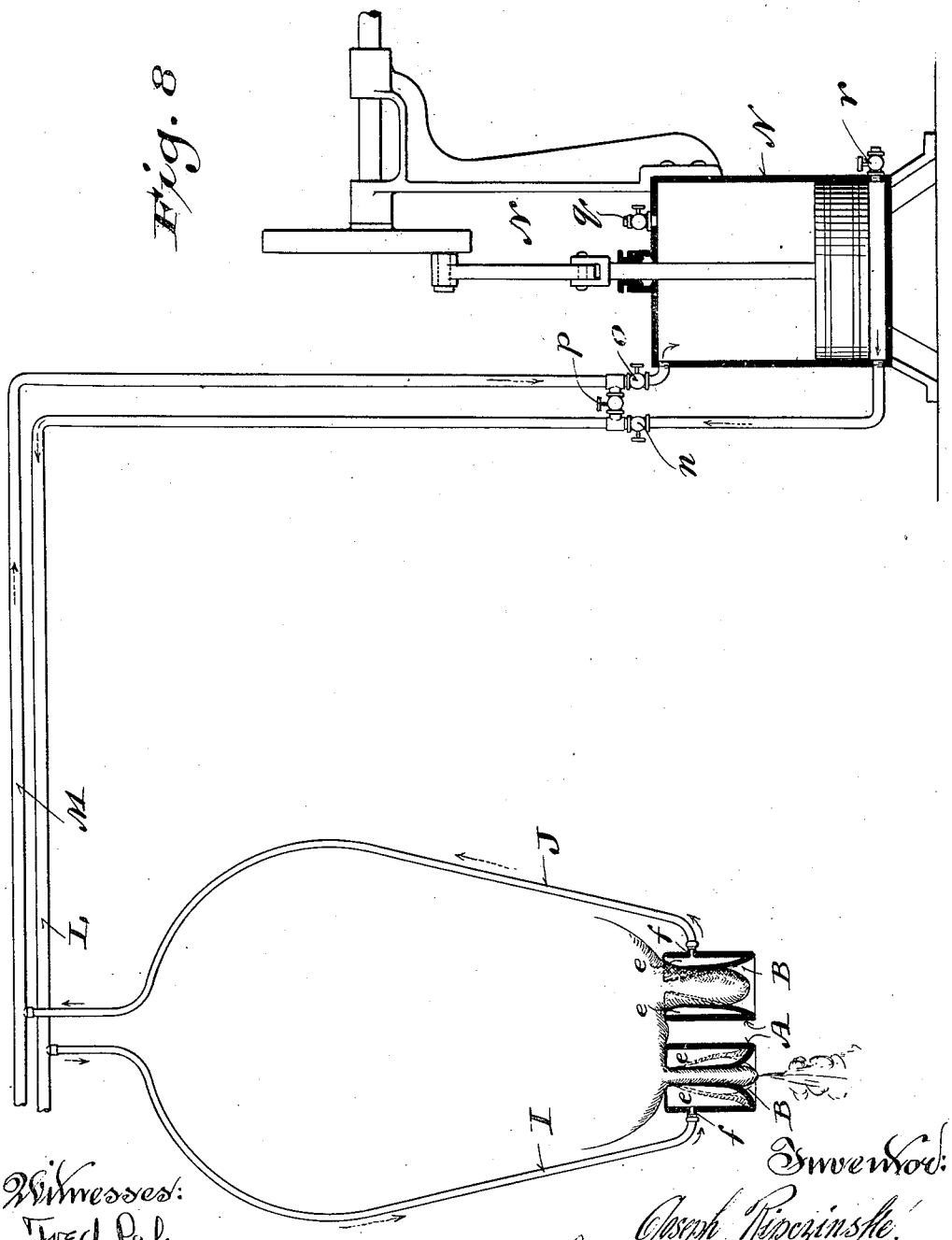

UNITED STATES PATENT OFFICE.

JOSEPH RIPCZINSKE, OF WAUSAU, WISCONSIN.

COW-MILKER.

No. 859,254.   Specification of Letters Patent.   Patented July 9, 1907.

Application filed February 13, 1907. Serial No. 357,165.

*To all whom it may concern:*

Be it known that I, JOSEPH RIPCZINSKE, a citizen of the United States, and a resident of Wausau, in the county of Marathon and State of Wisconsin, have invented certain new and useful Improvements in Cow-Milkers; and I do hereby declare that the following is a full, clear, and exact description thereof.

The object of my invention is to provide a simple, durable and effective apparatus for milking cows, the parts of which are so constructed and arranged as to be readily adjusted to the udder, and when operating simulates the motions of the human hand as applied to the teats of cows in milking, thereby overcoming all difficulties heretofore encountered in milking-machines, caused through mechanical-strain or suction to draw the milk, said device being especially sanitary for the reason that the milk does not come in contact with any surface liable to contain germs as it passes to the pail.

The invention therefore consists in certain peculiarities of construction and combination of parts as hereinafter fully described with reference to the accompanying drawings, and subsequently claimed.

In the drawings: Figure 1 represents a rear sectional view of a cow-milker embodying the features of my invention, the section being indicated by line 1—1 of Fig. 2, said view also illustrates a milk-pail suspended in position under the device, with the udder and teats of a cow in dotted lines; Fig. 2, a side elevation of the same with the bucket removed; Fig. 3, a top plan view of the four milking-shells showing the coupling-links connecting the same, one of said shells being in section to better illustrate the details thereof; Figs. 4 and 5 detail longitudinal sections of the shells, as indicated by lines 4—4 of Fig. 5, and 5—5 of Fig. 4, respectively; Fig. 6, a detail section on line 6—6 of Fig. 4, showing the detachable coupling-connection between the pairs of shells; Fig. 7, a side elevation of the milker adjusted to a cow, with suspension-straps and bucket in position, and Fig. 8, a diagrammatic sectional view of the apparatus as a whole, showing the manner of connecting the air-tubes leading from the shells to a pipe-system in connection with an air-pump.

Referring by letter to the drawings, A indicates circular shells preferably composed of rubber with a reinforce strip $a$ of any suitable material. Each shell has an inner membrane B of soft rubber, (as best shown in Fig. 4) that forms a sleeve therein having its ends merging into the upper and lower ends of the shell and connected to the inner walls thereof by division-ribs $b$ upon opposite sides, the ribs being provided with apertures $c$ communicating with the division of said shell. When the membrane is in its normal position it forms a wedge-shaped opening through the shell, the upper end or mouth $d$ being narrowed to a slit which in width extends across the diameter of said shell, while the lower end merges into the circular side-walls thereof, the tapered sides of said membrane being gradually increased in thickness as they diverge from the upper slitted opening.

By the above construction it will be seen that closed communicating chambers $e$ are formed on opposite sides of the shell-ribs, said chambers being provided for alternate expansion and contraction of the free side-walls of the membrane, the function of which is to manipulate the teats and thereby draw the milk from the udder in a gentle and effective manner. Each shell is provided with a nipple $f$ that communicates with the chamber thereof, there being pairs of threaded studs $g$, $g'$, projecting from the exterior wall of said shells at right-angles to each other for engagement with connecting-links C, D, that couple the aforesaid shells together. The pairs of shells which come upon opposite sides of the cow are permanently connected by the adjustable links C, which links have notched-ends that engage the adjacent studs $g$ and are held in place thereon by thumb-nuts $h$, the several notches being provided for adjusting the shells to various distances to accommodate the widths between teats of different cows. The permanently coupled shells are in turn connected by the cross-links D, which links are hinged to the studs $g'$ of one pair of the aforesaid side shells and have their opposite ends notched and held by thumb-nut $h'$ in engagement with the adjacent studs $g'$ of the opposite pair of shells. The said cross-links D are formed of two bars that are connected by a strap $i$, whereby, when it is desired to disconnect the pair of shells, the upper bar may be raised, by means of a handle $j$, from the stud $g'$, and the lower bar will simultaneously release.

Each pair of shells are suspended from yokes E by straps F that are pivoted upon the upper studs $g$ of said pair of shells, and in hinge-connection with the yokes. The said yokes are provided with end-buckles K, and have centrally pivoted thereto depending hooks G, which hooks engage the eyes of a milk-pail and suspend the same under the milker, and when the weight of the pail is relieved therefrom the hooks are thrown out of engagement with the eyes of the pail, by contact-springs $m$ that are secured to the aforesaid yokes.

The weight of the milker, when adjusted to a cow, is sustained by a sling or strap H that is passed over the back of the animal, the strap being composed, in this instance, of two leather straps connected by suitable cross-pieces. The ends of these straps are fastened in the buckles K of the yokes, thereafter the teats being inserted into the shells and the pail hung upon the hooks, and the device is ready for use.

As best illustrated in Figs. 7 and 8 of the drawings, the nipples $f$ of each pair of shells are connected by branches of flexible pipes I, J, which pipes in turn are coupled to pipes L, M, respectively, that communicate with the cylinder of an air-pump N, the pipes being provided with valves n, o, and connected by a branch above said valves, which branch is also fitted with a valve p. The pipe L communicates with the pump-cylinder adjacent to its lower head, and pipe M enters the cylinder near its upper head, there being upper and lower valves q, r, respectively, in connection with said cylinder upon opposite sides of its piston.
When the teats are to be inserted into the membranes of the shells, a partial vacuum must be formed so as to contract said membranes of each pair of shells, this is accomplished simultaneously as follows: The piston being in the position as shown in the diagram Fig. 8, valve o is closed and the cylinder-valve q opened, the lower valve r of said cylinder being also closed and valves n, p, opened. Now if the piston is drawn up, it is apparent that air will be drawn from pipes L and also pipe M, through the branches thereof into the bottom of the cylinder, thus collapsing all of the membranes by exhausting the air from their respective chambers e, the air above the piston-head being expelled through valve q. If the piston is at the upper end of its stroke, the same result is obtained as above described, by closing valves n and q, and opening valve r, thereby transferring the suction-operation to pipe M at the upper portion of the pump-cylinder. In milking, valves q and r are closed, as is also the valve p in the branch-pipe, this being done (see Fig. 8) a downstroke of the piston-head causes air to be forced into the chambers e of the pair of shells connected to pipe L, which action thereby expels the milk from the teat. Simultaneous with the above described action, the air is exhausted from the chambers e of the opposite pair of shells, through the suction produced from pipe M by the piston-head, this action releasing the teats from grip by the membranes, thereby permitting the said teats to fill preparatory to a reversal of the operation.

Owing to the graduated thickness of the vibratory walls of the membranes, it will be seen that the first expansive impulse thereof tends to grip the teat at its base, and as the air-pressure increases the thicker portion of the walls are distended, thus producing a gradual rolling or wave motion from the base of said teat to its end in order to expel all of the milk.

In practice, the lead-pipes from the pump are extended any length over the stalls of a herd of cows, with provision for attaching as many milkers as may be desired, it being understood that the pump may be driven by suitable power.

The described harness-attachment for the milker renders the same readily detachable, it being only necessary to uncouple the links that connect the pairs of shells in order to swing the entire device clear of the animal, it being however within the scope of my invention to vary the details thereof as well as other details of construction herein described, the essential feature of my invention being a shell provided with vibratory air-controlled membranes for the purpose specified.

I claim:
1. A cow-milking apparatus comprising an open-end shell, having an inner flexible membrane forming a closed chamber, the thickness of the membrane being gradually varied from end to end; the combination of a closed-head pump-cylinder, a reciprocative piston in the cylinder, and a pipe in unobstructed connection with the closed chamber of the shell and closed-head of the pump-cylinder, whereby compression and suction of air by alternate strokes of the pump-piston expand and contract the shell-membrane.
2. A cow-milker comprising a shell open at both ends, an inner membrane in connection with the shell forming a chamber, the walls of the membrane being varied in thickness from end to end; the combination of a pipe in connection with the shell chamber, and an air-suction and discharge apparatus connected to the pipe.

3. A cow-milker comprising chambered open-end shells, the inner walls thereof being of flexible material varying in thickness from end to end, the combination of a pump-cylinder, a reciprocative piston in the cylinder, a pipe in connection with one of the shells and an end of the pump-cylinder, and a pipe in connection with another shell and the opposite end of said pump-cylinder.

4. A cow-milker comprising two pairs of chambered open-end shells, the inner walls of said shells being varied in thickness from end to end; the combination of a closed pump-cylinder, valves in each end of the cylinder, a reciprocative piston in said cylinder, a pipe in connection with one pair of the chambered shells and one end of the pump-cylinder, a cut-off valve in the pipe, a pipe in connection with the other pair of chambered shells and opposite end of the cylinder from that of the first named pipe, a cut-off valve in the last named pipe, and a valve-controlled branch-pipe connecting the pipes aforesaid above their respective cut-off valves.
5. A cow-milker comprising pairs of open-end air-controlled chambered shells, each pair being adjustably connected together, detachable means for connecting the pairs of shells, means for suspending a pail to the shells, and a harness in connection with said shells adapted to be held in adjusted position to the cow-udder.

6. A cow-milker comprising pairs of chambered-shells having inner flexible side-walls, detachable means for connecting the pairs of shells, means for suspending said shells from the back of a cow, pail-hooks secured to the suspension-means, a pump-cylinder, and tubes connecting the chambers of the pairs of shells to the upper and lower ends of the pump-cylinder.

In testimony that I claim the foregoing I have hereunto set my hand at Milwaukee in the county of Milwaukee and State of Wisconsin in the presence of two witnesses.

JOSEPH RIPCZINSKE.

Witnesses:
GEO. W. YOUNG,
RAYMOND RIPCZINSKE.